UNITED STATES PATENT OFFICE.

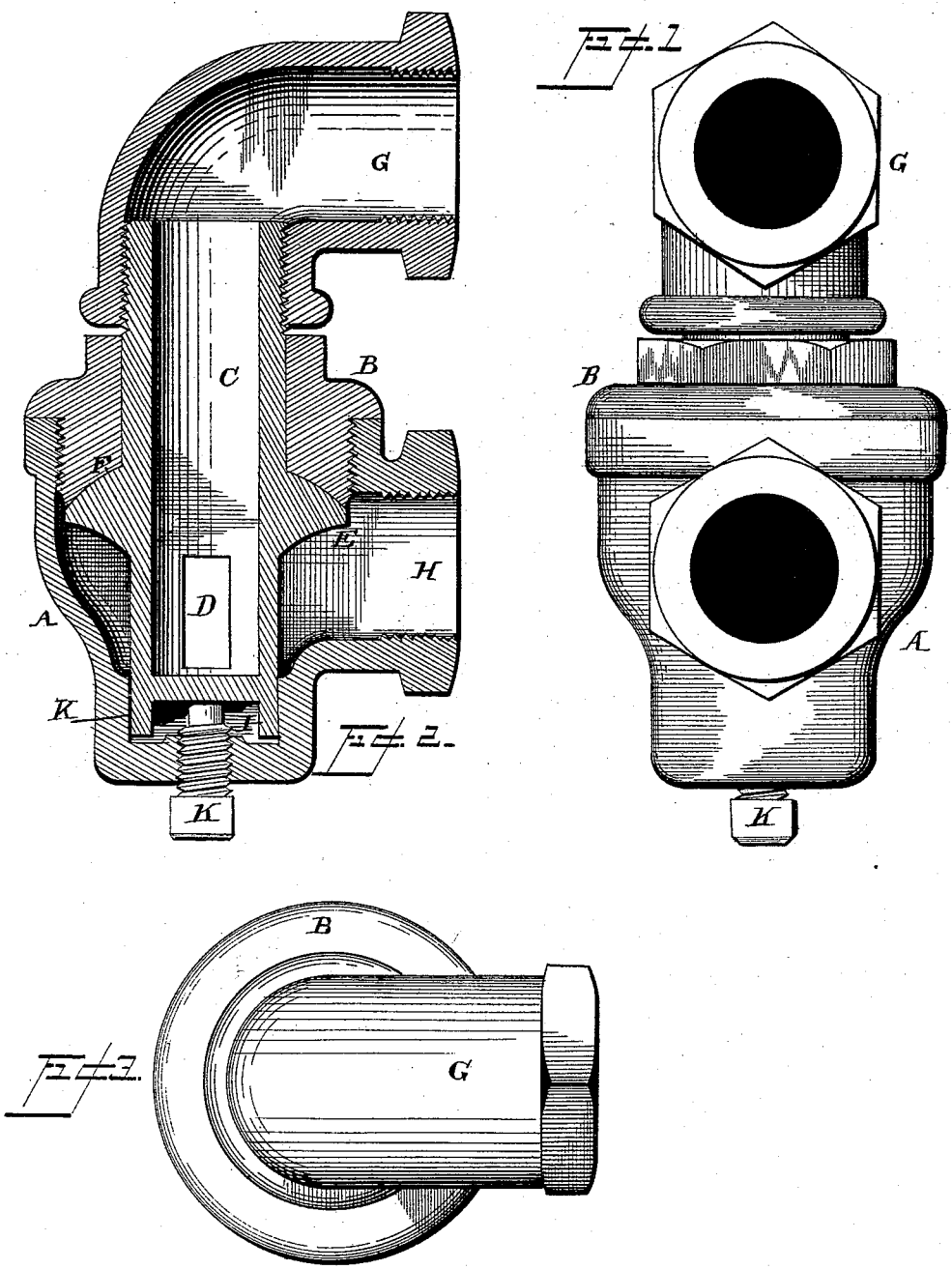

CLARENCE W. BAILEY, OF SAN FRANCISCO, CALIFORNIA.

SWING-JOINT.

SPECIFICATION forming part of Letters Patent No. 492,619, dated February 28, 1893.

Application filed October 20, 1892. Serial No. 449,509. (No model.)

*To all whom it may concern:*

Be it known that I, CLARENCE W. BAILEY, a citizen of the United States, residing at San Francisco, in the county of San Francisco, State of California, have invented certain new and useful Improvements in Swing-Joints; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to hydraulic air or steam tight swinging joints for piping or tubing.

The invention consists in the following construction and combination of parts which will first be fully set forth and described in detail and the elements of novelty then pointed out and claimed.

Figure 1 represents a side elevation of a joint embodying my improvements. Fig. 2 is a central vertical sectional view of the swing joint, and Fig. 3 is a top plan view of the same.

In the drawings—A represents the main casing or shell of my invention.

B is a screw cap entering an opening at one end of the casing A.

C is a central tubular sleeve having a rotatory movement within the cap B and a socket K in the casing A.

D are radial openings cut in the sleeve C which establish communication between the sleeve and the casing A.

E is a ball joint formed on the exterior of sleeve C, which is adapted to tightly fit a similar depression F on the cap B, forming a hydraulic steam or air tight swing joint between the sleeve and its exterior casing.

G is an elbow which is screwed upon the upper end of the sleeve C. This elbow G with the opening H of the casing A forms the two threaded openings for any pipe connections which it may be desirable to provide with my improved swing joint.

I represents the lower end of the sleeve C which enters the socket K. It has a transverse bar or diaphragm against which the adjusting set screw L bears for the purpose of regulating the degree of contact between the ball joint bearings E and F in order to make said joint fluid pressure tight, and at the same time permit a swinging movement of the joint. This provision however is only necessary when there is little or no pressure within the joint. The pressure circulating through the swing joint presses the ball joint E against its seat F forming a hydraulic, steam or air tight swing joint between the sleeve and its exterior casing. Owing to the length of the interior sleeve which carries the ball joint, and its peculiar configuration with relation to its exterior casing, I am enabled to produce a swing joint having an elongated journaled bearing which is a great desideratum in swing joints subjected to hard usage.

I claim—

The combination of an exterior casing having a journal bearing at one end, a screw cap at the other provided with an interior ball joint seat and an axial bearing therethrough, and a pipe opening entering the casing at one side, with an interior hollow revolving sleeve seated in the journal bearings in the casing and the screw cap provided with an exterior annular ball joint midway thereof, radial openings in the sleeve below the ball joint and an axial internal bore open at the top and closed at the bottom, and an adjusting set screw in the bottom of the casing for adjusting said sleeve.

In testimony whereof I affix my signature in presence of two witnesses.

CLARENCE W. BAILEY.

Witnesses:
MATTHEW ARNOLD,
F. C. MOSEBACH.